United States Patent
Mouri et al.

(10) Patent No.: US 10,935,729 B2
(45) Date of Patent: Mar. 2, 2021

(54) METHOD FOR MANUFACTURING OPTICAL DEVICE, METHOD FOR MANUFACTURING LASER DEVICE, METHOD FOR ADJUSTING BEAM QUALITY OF LASER DEVICE

(71) Applicant: Fujikura Ltd., Tokyo (JP)

(72) Inventors: Toshio Mouri, Sakura (JP); Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 216 days.

(21) Appl. No.: 16/094,097

(22) PCT Filed: Feb. 2, 2017

(86) PCT No.: PCT/JP2017/003709
§ 371 (c)(1),
(2) Date: Oct. 16, 2018

(87) PCT Pub. No.: WO2017/183253
PCT Pub. Date: Oct. 26, 2017

(65) Prior Publication Data
US 2019/0094469 A1 Mar. 28, 2019

(30) Foreign Application Priority Data
Apr. 19, 2016 (JP) .............................. JP2016-083678

(51) Int. Cl.
*G02B 6/32* (2006.01)
*G02B 3/00* (2006.01)
(Continued)

(52) U.S. Cl.
CPC .............. *G02B 6/32* (2013.01); *G02B 3/0087* (2013.01); *G02B 6/262* (2013.01); *G02B 6/2551* (2013.01)

(58) Field of Classification Search
None
See application file for complete search history.

(56) References Cited

U.S. PATENT DOCUMENTS

| 5,108,167 A | 4/1992 | Kandpal et al. |
| 6,219,481 B1 | 4/2001 | Cheng |
(Continued)

FOREIGN PATENT DOCUMENTS

| CN | 1677146 A | 10/2005 |
| CN | 101231368 A | 7/2008 |
(Continued)

OTHER PUBLICATIONS

International Search Report dated Mar. 14, 2017, issued in counterpart application No. PCT/JP2017/003709 (2 pages).
(Continued)

*Primary Examiner* — Jerry Rahll
(74) *Attorney, Agent, or Firm* — Westerman, Hattori, Daniels & Adrian, LLP

(57) ABSTRACT

An optical device 30 has a GRIN lens 35, a preceding-stage optical fiber 31 from which a light beam is entered to the GRIN lens 35, and a subsequent-stage optical fiber 32 to which a light beam emitted from the GRIN lens 35 is entered. A method for adjusting beam quality includes a measurement process P2 in which a light beam is entered to the preceding-stage optical fiber 31 and the beam quality of a light beam to be emitted from the subsequent-stage optical fiber 32 through the GRIN lens 35 is measured, and an adjustment process P3 in which the length of the GRIN lens 35 is adjusted on the basis of a result in the measurement process P2.

13 Claims, 2 Drawing Sheets

(51) Int. Cl.
*G02B 6/26* (2006.01)
*G02B 6/255* (2006.01)

(56) References Cited

U.S. PATENT DOCUMENTS

| | | |
|---|---|---|
| 6,385,855 B1 | 5/2002 | Tymianski |
| 7,340,138 B1 | 3/2008 | Yablon |
| 2002/0150333 A1 | 10/2002 | Reed et al. |
| 2009/0274180 A1 | 11/2009 | Nicholson et al. |

FOREIGN PATENT DOCUMENTS

| | | |
|---|---|---|
| JP | 2005-17616 A | 1/2005 |
| JP | 2008-181131 A | 8/2008 |
| JP | 2009-186775 A | 8/2009 |
| JP | 2009-271528 A | 11/2009 |
| JP | 2016-118717 A | 6/2016 |
| WO | 2012/124092 A1 | 9/2012 |

OTHER PUBLICATIONS

Notification of Reason for Refusal dated Aug. 22, 2017, issued in counterpart Japanese Patent Application No. 2016-083678 (3 pages).
Notification of Reason for Refusal dated May 1, 2018, issued in counterpart Japanese Patent Application No. 2016-083678 (2 pages).
Notice of Allowance dated Nov. 13, 2018, issued in counterpart Japanese Application No. 2016-083678, with English machine translation. (6 pages).

METHOD FOR MANUFACTURING OPTICAL DEVICE, METHOD FOR MANUFACTURING LASER DEVICE, METHOD FOR ADJUSTING BEAM QUALITY OF LASER DEVICE

TECHNICAL FIELD

The present invention relates to a method for manufacturing an optical device, a method for manufacturing a laser device, and a method for adjusting the beam quality of a laser device.

BACKGROUND ART

Fiber laser devices are excellent in light condensing properties, have high power density, and provide a light beam to form a small beam spot. Because of these reasons, the fiber laser devices are used in various fields, such as laser beam machining fields and medical fields. A light beam emitted from a fiber laser device is excellent in the light condensing properties in the case in which beam quality expressed by beam parameter products (BPP), for example, is excellent. In the case in which beam quality is excellent, BPP values are small.

Patent Literature 1 below describes a fiber laser device excellent in the light condensing properties. In this fiber laser device, a gradient index (GRIN) lens is placed in the midway point of an optical fiber through which an emitted light beam is guided.

CITATION LIST

Patent Literature

[Patent Literature 1] JP2009-271528 A

SUMMARY OF INVENTION

However, depending on the application of the fiber laser device, beam quality sometimes has to be moderately adjusted, which brings a good result.

Therefore, the present invention is to provide a method for manufacturing an optical device that can provide a light beam to be emitted with a predetermined beam quality, a method for manufacturing a laser device, and a method for adjusting the beam quality of a laser device.

The present invention is a method for manufacturing an optical device having a GRIN lens, a preceding-stage optical fiber from which a light beam is entered to the GRIN lens, and a subsequent-stage optical fiber to which a light beam emitted from the GRIN lens is entered, the method including: a measurement process in which a light beam is entered to the preceding-stage optical fiber and beam quality of a light beam to be emitted from the subsequent-stage optical fiber through the GRIN lens is measured; and an adjustment process in which a length of the GRIN lens is adjusted on the basis of a result in the measurement process.

In addition, the present invention is a method for manufacturing a laser device including an optical device having a GRIN lens, a preceding-stage optical fiber from which a light beam is entered to the GRIN lens, and a subsequent-stage optical fiber to which a light beam emitted from the GRIN lens is entered, and a light source configured to emit a light beam to be entered to the preceding-stage optical fiber, the method including: a measurement process in which a light beam is entered from the light source to the preceding-stage optical fiber and beam quality of a light beam to be emitted from the subsequent-stage optical fiber through the GRIN lens is measured; and an adjustment process in which a length of the GRIN lens is adjusted on the basis of a result in the measurement process.

In addition, the present invention is a method for adjusting beam quality of a laser device including an optical device having a GRIN lens, a preceding-stage optical fiber from which a light beam is entered to the GRIN lens, and a subsequent-stage optical fiber to which a light beam emitted from the GRIN lens is entered, and a light source configured to emit a light beam to be entered to the preceding-stage optical fiber, the method including: a measurement process in which a light beam is entered from the light source to the preceding-stage optical fiber and beam quality of a light beam to be emitted from the subsequent-stage optical fiber through the GRIN lens is measured; and an adjustment process in which a length of the GRIN lens is adjusted on the basis of a result in the measurement process.

In accordance with the method for manufacturing an optical device, the method for manufacturing a laser device, and the method for adjusting the beam quality of a laser device, the length of the GRIN lens is adjusted on the basis of the result in the measurement process in which beam quality is measured. Thus, this enables the appropriate adjustment of the length of the GRIN lens in such a manner that the light beam to be emitted from the subsequent-stage optical fiber has a predetermined beam quality. Therefore, the light beam to be emitted can be provided with a predetermined beam quality. Note that, in the measurement process, the light beam to be measured may be a light beam to be directly emitted from the subsequent-stage optical fiber, or may be a light beam to be emitted through an optical member connected to the subsequent-stage optical fiber.

In the invention, a diameter of a core of the subsequent-stage optical fiber is preferably greater than a diameter of a light beam to be emitted from the GRIN lens.

With this configuration, the light beam emitted from the GRIN lens can be prevented from leaking from the core of the subsequent-stage optical fiber. Note that, the diameter of the light beam to be emitted from the GRIN lens is the diameter of the core of the preceding-stage optical fiber or more. Thus, the diameter of the core of the subsequent-stage optical fiber is the diameter of the core of the preceding-stage optical fiber or more.

The adjustment process is preferably performed by cutting the GRIN lens in a longitudinal direction.

Cutting the GRIN lens to adjust the length eliminates the preparation of a plurality of GRIN lenses. Thus, the adjustment process can be inexpensively performed.

Alternatively, the adjustment process is preferably performed by replacing the GRIN lens with another GRIN lens having a different length.

With the replacement of the GRIN lens, the length of the GRIN lens can be quickly adjusted. Note that, in replacing the GRIN lens, the GRIN lens can be replaced, with a part of at least one of the preceding-stage optical fiber and the subsequent-stage optical fiber connected. In this case, a part of at least one of the preceding-stage optical fiber and the subsequent-stage optical fiber is preferably connected to the other GRIN lens to be replaced.

A length of the GRIN lens is preferably less than a half pitch.

When the length of the GRIN lens exceeds a half pitch, the beam quality of the light beam to be emitted is sometimes degraded. Therefore, the length of the GRIN lens is less than a half pitch as described above, and this enables an excellent beam quality of the light beam to be emitted.

The length of the GRIN lens is preferably a quarter pitch or more.

The length of the GRIN lens is a quarter pitch or more, and this enables easy fusion splicing of the GRIN lens to the optical fiber.

As described above, in accordance with the present invention, there are provided a method for manufacturing an optical device that can provide a light beam to be emitted with a predetermined beam quality, a method for manufacturing a laser device, and a method for adjusting the beam quality of a laser device.

DESCRIPTION OF EMBODIMENTS

In the following, a preferred embodiment of a method for manufacturing an optical device, a method for manufacturing a laser device, and a method for adjusting the beam quality of a laser device according to the present invention will be described in detail with reference to the drawings.

<Laser Device>

First, the configuration of a laser device according to an embodiment will be described.

Figure 1:
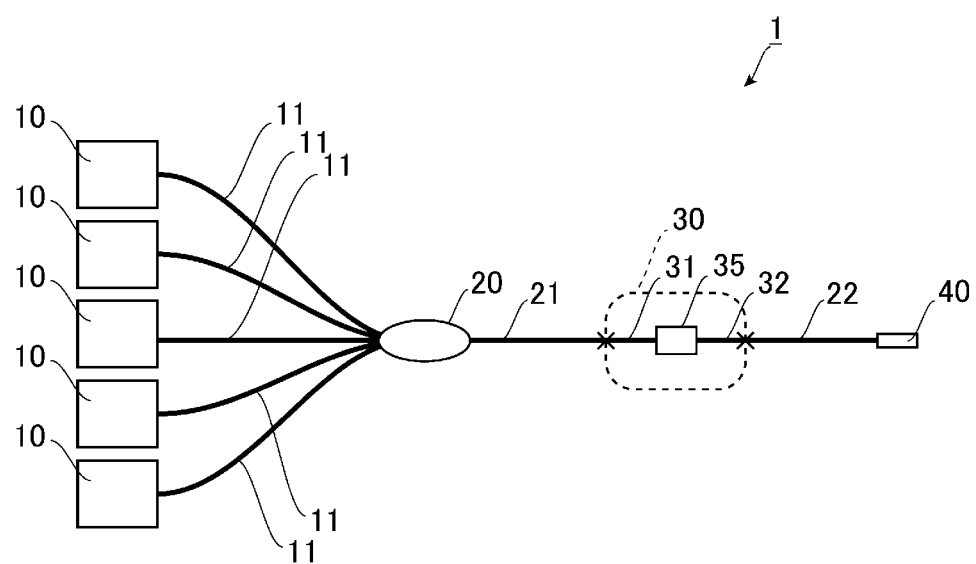
FIG. 1 is a conceptual diagram of a laser device according to an embodiment of the present invention.

FIG. 1 is a diagram of a laser device according to an embodiment of the present invention. As illustrated in FIG. 1, a laser device 1 according to the embodiment includes a plurality of light sources 10, an optical combiner 20, an optical device 30, and an output unit 40 as main components.

The light sources 10 are laser devices that emit a light beam at a predetermined wavelength. The light source 10 is a fiber laser device and a solid laser device, for example. In the case in which the light source 10 is a fiber laser device, the light source 10 is a resonant fiber laser device or a master oscillator power amplifier (MO-PA) fiber laser device. Light beams emitted from the light sources 10 are light beams at a wavelength of 1,050 nm, for example.

To the light sources 10, optical fibers 11 are individually connected. A light beam emitted from the light source 10 propagates through the optical fiber 11. The optical fiber 11 is a few-mode fiber having the diameter of the core that is about 20 μm, for example. Therefore, the light beams emitted from the light sources 10 propagate through the optical fibers 11 in approximately two to four linearly polarized modes.

The optical combiner 20 is a member that optically couples the cores of the individual optical fibers 11 to the core of the optical fiber 21. For example, the end faces of the optical fibers 11 are coupled to the end face of the optical fiber 21 having a diameter greater than the diameter of the optical fiber 11. The optical fiber 21 is a multimode fiber having the diameter of the core that ranges from about 50 to 100 μm, for example.

Figure 2:
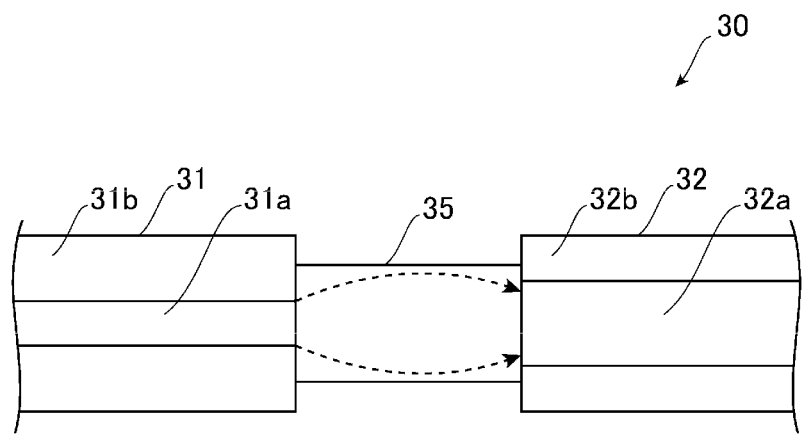
FIG. 2 is a diagram of an optical device in FIG. 1.

The optical device 30 is connected to the optical fiber 21. FIG. 2 is a diagram of the optical device in FIG. 1. As illustrated in FIG. 2, the optical device 30 includes a preceding-stage optical fiber 31, a GRIN lens 35, and a subsequent-stage optical fiber 32.

The preceding-stage optical fiber 31 has a core 31a and a cladding 31b in a configuration similar to the configuration of the optical fiber 21, for example. The first end of the preceding-stage optical fiber 31 is fusion-spliced to the optical fiber 21. The second end is fusion-spliced to the first end of the GRIN lens 35. Note that, the preceding-stage optical fiber 31 and the optical fiber 21 may be an integrated optical fiber having no fusion-spliced connection.

The GRIN lens 35 is a member whose refractive index is changed in the radial direction. The center of the GRIN lens 35 has a higher refractive index. Therefore, the diameter of a light beam propagating through the GRIN lens 35 is changed in a predetermined cycle. For example, the diameter of the light beam that is entered from the first end of the GRIN lens is increased and expanded to a predetermined diameter, the diameter is again decreased to the diameter of the light beam incident to the GRIN lens 35, and the diameter is again increased. The pitch in the GRIN lens is typically defined by the ratio of the length of the lens to the meandering cycle of the light beam propagating through the GRIN lens. Therefore, a half pitch is defined as the length in which a light beam is entered, the diameter of the light beam is the most increased, and the diameter is returned to the same diameter of the incident light beam. A quarter pitch is defined as the length in which a light beam is entered and the diameter of the light beam is the most increased. The light beam in a range from the incident end to a quarter pitch is a collimated light beam that forms an infinite image, for example. The diameter of the light beam propagating through the inside of the GRIN lens is the diameter of the incident light beam or more. The angle of divergence of the light beam propagating through the inside of the GRIN lens is the angle of divergence of the incident light beam or less. In the embodiment, the length of the GRIN lens 35 is a quarter pitch or more and less than a half pitch of a light beam emitted from the individual light sources 10 and propagating through the GRIN lens 35. The diameter of the GRIN lens 35 is greater than the diameter of the collimated light beam in a range from the incident end to a quarter pitch. In the embodiment, the diameter of the GRIN lens 35 is greater than the diameter of the core 31a of the preceding-stage optical fiber 31 and smaller than the diameter of the cladding 31b of the preceding-stage optical fiber 31. The first end of the subsequent-stage optical fiber 32 is fusion-spliced to the second end of the GRIN lens 35. Note that, FIG. 2 illustrates the state in which the outer circumferential surface of the GRIN lens 35 is exposed. However, the outer circumferential surface of the GRIN lens 35 may be surrounded by a cladding having a constant refractive index. Unlike FIG. 2, the diameter of the GRIN lens 35 may be greater than the diameter of the cladding 31b of the preceding-stage optical fiber 31.

The subsequent-stage optical fiber 32 has a core 32a and a cladding 32b. The diameter of the core 32a of the subsequent-stage optical fiber 32 is greater than the diameter of the light beam to be emitted from the GRIN lens 35. As described above, the diameter of the light beam propagating through the inside of the GRIN lens 35 is the diameter of a light beam or more. The light beam is entered from the preceding-stage optical fiber 31 to the GRIN lens 35. In the embodiment, the length of the GRIN lens 35 is a quarter pitch or more and less than a half pitch of the light beam propagating through the GRIN lens 35. Therefore, the diameter of the core 32a of the subsequent-stage optical fiber 32 is greater than the diameter of the core 31a of the preceding-stage optical fiber 31.

The first end of the optical fiber 22 is fusion-spliced to the second end of the subsequent-stage optical fiber 32 of the optical device 30. The optical fiber 22 has a configuration similar to the configuration of the subsequent-stage optical fiber 32. Therefore, the subsequent-stage optical fiber 32 and the optical fiber 22 may be an integrated optical fiber having no fusion-spliced connection. Note that, the diameter of the core of the optical fiber 22 may be greater than the diameter of the core 32a of the subsequent-stage optical fiber 32. The output unit 40 is connected to the second end of the optical fiber 22. The output unit 40 is a member having a glass rod greater in diameter than the diameter of the core of the optical fiber 22. The output unit 40 can emit a light beam with optical power density reduced.

Next, the operation of the laser device 1 according to the embodiment will be described.

After a light beam at a predetermined wavelength is emitted from the individual light sources 10, the light beams propagate through the optical fibers 11. The light beams are combined at the optical combiner 20, and the combined light beam propagates through the optical fiber 21. The light beam is then entered from the optical fiber 21 to the preceding-stage optical fiber 31, and entered from the preceding-stage optical fiber 31 to the GRIN lens 35. As described above, in the embodiment, the length of the GRIN lens 35 is a quarter pitch or more and less than a half pitch of the propagating light beam. Thus, the angle of divergence of the light beam that is entered from the GRIN lens 35 to the subsequent-stage optical fiber 32 is smaller than the angle of divergence of the light beam that is entered from the preceding-stage optical fiber 31 to the GRIN lens 35. This light beam propagates through the subsequent-stage optical fiber 32, and is emitted from the output unit 40 through the optical fiber 22.

As described above, in the laser device 1 according to the embodiment, the angle of divergence is decreased in the optical device 30. Therefore, the beam quality of the light beam to be emitted can be improved, compared with a laser device having no optical device 30.

<Method for Manufacturing the Laser Device>

Next, a method for manufacturing the laser device will be described. Note that, a method for manufacturing the laser device 1 according to the embodiment includes a method for adjusting the beam quality of the laser device 1, and a method for manufacturing the optical device 30.

(First Method)

Figure 3:
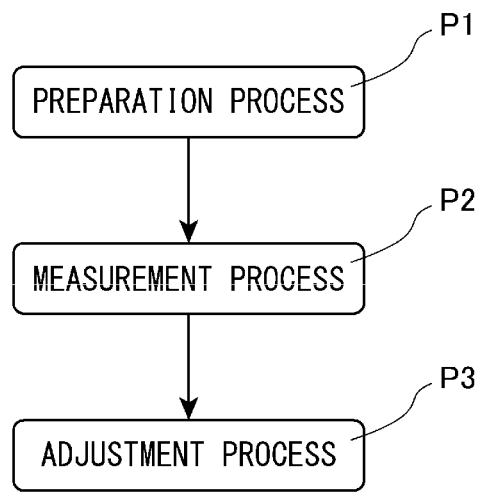
FIG. 3 is a flowchart of a method for adjusting beam quality.

FIG. 3 is a flowchart of the processes of a first method for manufacturing the laser device 1 according to the embodiment. As illustrated in FIG. 3, the method for manufacturing the laser device 1 according to the embodiment includes a preparation process P1, a measurement process P2, and an adjustment process P3.

<Preparation Process P1>

This process is a process for preparing necessary members. In the process, a member having the optical fibers 11 connected to the light sources 10 and the optical fiber 21 is prepared. A member having the preceding-stage optical fiber 31 fusion-spliced to the GRIN lens 35 is prepared, and the optical fiber 21 is fusion-spliced to the preceding-stage optical fiber 31. In this fusion splicing, in the method, the length of the GRIN lens 35 to be prepared is made slightly longer than the length with which a predetermined beam quality is obtained. The subsequent-stage optical fiber 32, the optical fiber 22, and the output unit 40 are prepared, the subsequent-stage optical fiber 32 is fusion-spliced to the optical fiber 22, and the optical fiber 22 is fusion-spliced to the output unit 40. Subsequently, the GRIN lens 35 is optically coupled to the subsequent-stage optical fiber 32. However, in this process, the GRIN lens 35 is not fusion-spliced to the subsequent-stage optical fiber 32. The GRIN lens 35 is optically coupled to the subsequent-stage optical fiber 32 in such a manner that the end face of the GRIN lens 35 contacts the end face of the subsequent-stage optical fiber 32.

<Measurement Process P2>

This process is a process for measuring beam quality. In the process, a light beam is emitted from the individual light sources 10. As described above, the light beam has the angle of divergence that is decreased in the GRIN lens 35, and the light beam is emitted from the output unit 40. The light beam emitted from the output unit 40 is entered to a beam quality measurement device to measure the beam quality of the light beam. In the embodiment, a BPP value is measured. This measurement enables the determination whether the beam quality of the light beam falls in a predetermined range. The light beam is entered to the preceding-stage optical fiber 31, and the light beam is to be emitted from the subsequent-stage optical fiber 32 through the GRIN lens 35.

<Adjustment Process P3>

This process is a process for adjusting the length of the GRIN lens 35 on the basis of the result in the measurement process P2.

In the method, the process is performed as below. That is, as described above, the GRIN lens 35 prepared in the preparation process P1 has a length slightly longer than the length with which a predetermined beam quality is obtained. Therefore, the beam quality measured in the measurement process P2 is highly likely out of a range of a predetermined beam quality. Therefore, in the method, the length of the GRIN lens 35 is shortened on the basis of the measured result obtained in the measurement process P2. Specifically, the end face of the GRIN lens that is not fusion-spliced to the subsequent-stage optical fiber 32 is shortened by polishing. In this polishing, the amount to polish the GRIN lens is determined on the basis of the measured result. Accordingly, the length of the GRIN lens 35 is adjusted.

In the method, the measurement process P2 is again performed. As a result in the measurement process P2, when beam quality falls in a predetermined range, the GRIN lens 35 is fusion-spliced to the subsequent-stage optical fiber 32, and the adjustment of the beam quality of the laser device 1 is completed as well as the optical device 30 and the laser device 1 are completed. On the other hand, as a result in the measurement process P2, when beam quality is out of a predetermined range, the adjustment process P3 is again performed, and the measurement process P2 is performed. As described above, the measurement process P2 and the adjustment process P3 are repeated until beam quality falls in a predetermined range. After beam quality falls in a predetermined range, the GRIN lens 35 is fusion-spliced to the subsequent-stage optical fiber 32, and the adjustment of the beam quality of the laser device 1 is completed as well as the optical device 30 and the laser device 1 are completed.

(Second Method)

A flowchart showing the processes of this method is similar to the flowchart of FIG. 3 showing the processes of the first method.

<Preparation Process P1>

This process of the method is different from the first method in that a plurality of GRIN lenses 35 having a part of the preceding-stage optical fiber 31 fusion-spliced to a part of the subsequent-stage optical fiber 32 is prepared. The plurality of GRIN lenses 35 to be prepared has different lengths from each other. In the method, the other part of the preceding-stage optical fiber 31 is fusion-spliced to the optical fiber 21, and the other part of the subsequent-stage optical fiber 32 is fusion-spliced to the optical fiber 22. The GRIN lens 35 having the length with which a predetermined beam quality can be obtained is selected, the other part of the preceding-stage optical fiber 31 fusion-spliced to the optical fiber 21 is fusion-spliced to a part of the preceding-stage optical fiber 31 fusion-spliced to the GRIN lens 35, and the other part of the subsequent-stage optical fiber 32 fusion-spliced to the optical fiber 22 is fusion-spliced to the part of the subsequent-stage optical fiber 32 fusion-spliced to the GRIN lens 35.

<Measurement Process P2>

The measurement process P2 of the method is performed similarly to the measurement process P2 of the first method.

<Adjustment Process P3>

In the adjustment process P3 of the method, the length of the GRIN lens is adjusted by replacing the GRIN lens 35 with another GRIN lens 35 having a different length. The other GRIN lens 35 is selected on the basis of the result in the measurement process P2. The replacement of the GRIN lens is as below. First, a part of the preceding-stage optical fiber 31 and the other part, which are fusion-spliced to each other, are cut, and a part of the subsequent-stage optical fiber 32 and the other part, which are fusion-spliced to each other, are cut. A part of the preceding-stage optical fiber 31 connected to the other GRIN lens is fusion-spliced to the other part of the preceding-stage optical fiber 31 fusion-spliced to the optical fiber 21, and a part of the subsequent-stage optical fiber 32 connected to the other GRIN lens is fusion-spliced to the other part of the subsequent-stage optical fiber 32 fusion-spliced to the optical fiber 22. The replacement of the GRIN lens is thus completed, and the length of the GRIN lens is adjusted.

After that, the measurement process P2 is performed similarly to the first method, and the measurement process P2 and the adjustment process P3 of the method are repeated until beam quality falls in a predetermined range. The beam quality falls in a predetermined range, and thus the adjustment of the beam quality of the laser device 1 is completed as well as the optical device 30 and the laser device 1 are completed.

As described above, in accordance with the method for manufacturing the optical device 30 of the embodiment, the method for manufacturing the laser device 1, and the method for adjusting the beam quality of the laser device 1, the length of the GRIN lens 35 is adjusted on the basis of the result in the measurement process P2 for measuring beam quality. Thus, this enables the appropriate adjustment of the length of the GRIN lens 35 in such a manner that the light beam to be emitted from the subsequent-stage optical fiber 32 has a predetermined beam quality. Therefore, the light beam to be emitted can be provided with a predetermined beam quality.

In the embodiment, the diameter of the core 32a of the subsequent-stage optical fiber 32 is greater than the diameter of the light beam to be emitted from the GRIN lens 35. Thus, the light beam emitted from the GRIN lens 35 can be prevented from leaking from the core 32a of the subsequent-stage optical fiber 32.

In the first method according to the embodiment, the adjustment process P3 is performed by cutting the GRIN lens in the longitudinal direction. Thus, a plurality of GRIN lenses 35 does not have to be prepared, and the adjustment process P3 can be inexpensively performed.

In the second method according to the embodiment, the adjustment process P3 is performed by replacing the GRIN lens 35 with the other GRIN lens having a different length. Thus, the length of the GRIN lens can be quickly adjusted. Note that, in the second method, a part of the preceding-stage optical fiber 31 and the other part of the subsequent-stage optical fiber 32 are fusion-spliced to the GRIN lens 35, respectively. However, in the second method, the adjustment process P3 only has to be performed by replacing the GRIN lens 35 with the other GRIN lens having a different length. Thus, replacing methods are non-limiting. For example, in the preparation process P1, the preceding-stage optical fiber is fusion-spliced to the optical fiber 21 with no separation of the preceding-stage optical fiber, and the subsequent-stage optical fiber 32 is fusion-spliced to the optical fiber 22 with no separation of the subsequent-stage optical fiber 32. The preceding-stage optical fiber 31 is optically coupled to the GRIN lens 35 without fusion-splicing the preceding-stage optical fiber 31 and the subsequent-stage optical fiber 32 to the GRIN lens 35, and the subsequent-stage optical fiber 32 is optically coupled to the GRIN lens 35. This optical coupling only has to be performed similarly to the optical coupling of the GRIN lens 35 to the subsequent-stage optical fiber 32 in the first method. In the adjustment process P3, the GRIN lens alone only has to be replaced with the other GRIN lens having a different length.

In the foregoing embodiment, the length of the GRIN lens 35 is less than a half pitch. Thus, this enables an excellent beam quality of the light beam to be emitted. In the foregoing embodiment, the length of the GRIN lens 35 is a quarter pitch or more. Thus, this enables easy fusion splicing of the GRIN lens 35 to the preceding-stage optical fiber 31 and the subsequent-stage optical fiber 32.

Next, the fact that the beam quality of the light beam to be emitted can be made excellent with the GRIN lens 35 having a length less than a half pitch will be described on the basis of measurement.

Figure 4:
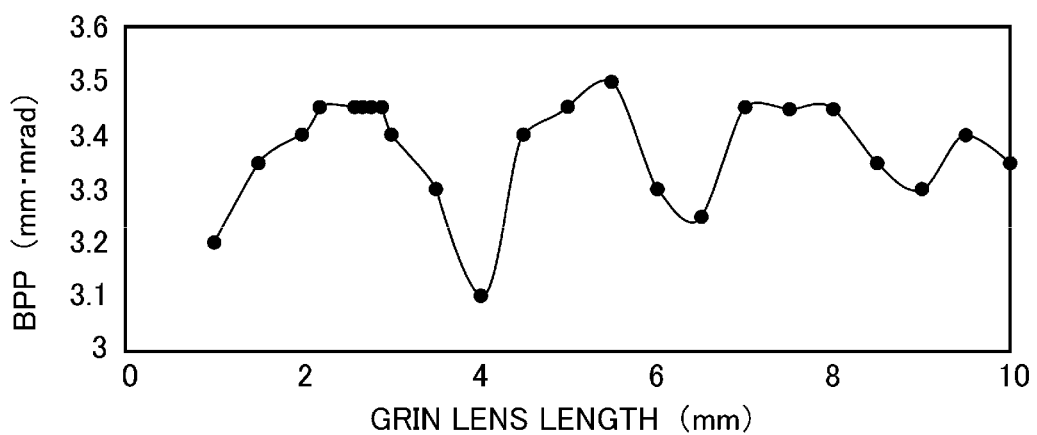
FIG. 4 is a diagram of the relationship between beam quality and the length of a GRIN lens.

In the measurement, first, the optical device 30 of the forgoing embodiment was prepared. The optical device 30 to be prepared in the measurement was as below. The diameter of the core 31a of the preceding-stage optical fiber 31 was 70 µm, the outer diameter of the cladding 31b was 360 µm, and the numerical aperture (NA) was 0.24. The relative refractive index difference between the outer circumference side and the center of the GRIN lens 35 was 0.055%, the lens diameter was 119 µm, and the lens length was 10 mm. The diameter of the core 32a of the subsequent-stage optical fiber 32 was 100 µm, the outer diameter of the cladding 31b was 360 µm, and numerical aperture (NA) was 0.24. A light beam whose NA was 0.07 was entered to this optical device and the lens length of the GRIN lens 35 was gradually decreased to measure the beam quality of the light beam to be emitted from the subsequent-stage optical fiber 32. FIG. 4 shows the result.

FIG. 4 is a diagram of the relationship between beam quality and the length of the GRIN lens 35. In FIG. 4, the minimum points at which the GRIN lens length is approximately 1 mm, 4 mm, 6.5 mm, and 9 mm are points at which the GRIN lens length is a quarter pitch, a 3/4 pitch, a 5/4 pitch, and a 7/4 pitch. FIG. 4 reveals that BPP values are more increased and beam quality is worse as the length of the GRIN lens 35 is more increased in the order of a quarter pitch, a 3/4 pitch, a 5/4 pitch, and a 7/4 pitch. It can be considered that this is because a part of the light beam propagating through the GRIN lens 35 is reflected off the side surface of the GRIN lens 35. It can be considered that this reflection mainly occurs at portions where the diameter of the light beam propagating through the GRIN lens 35 is the maximum. Therefore, the GRIN lens 35 is shorter than a half pitch at which the diameter of the light beam propagating through the GRIN lens 35 first becomes the largest. Thus, the degradation of beam quality can be reduced.

As described above, the present invention is decried using the embodiment as an example. However, the present invention is interpreted with no limitation to the foregoing embodiment.

For example, the optical device 30 is provided at a portion where the light beam emitted from the laser device propagates. However, the optical device 30 may be provided at any portion where the light beam is entered from the light source. For example, the optical device 30 may be provided in the midway points of the optical fibers 11 of the foregoing embodiment.

In the foregoing embodiment, the length of the GRIN lens 35 is a quarter pitch or more and less than a half pitch. However, the length of the GRIN lens 35 may be longer than a half pitch, or shorter than a quarter pitch.

In the foregoing embodiment, the diameter of the core 32a of the subsequent-stage optical fiber 32 is greater than the diameter of the light beam to be emitted from the GRIN lens 35. However, the diameter of the core 32a may be the same as the diameter of the light beam to be emitted from the GRIN lens 35. The diameter of the core 32a may be the diameter of the light beam to be emitted from the GRIN lens 35 or less, when the efficiency of the laser device 1 is ignored.

As described above, in accordance with the present invention, there are provided a method for manufacturing an optical device that can provide a light beam to be emitted with a predetermined beam quality, a method for manufacturing a laser device, and a method for adjusting the beam quality of a laser device. These methods are expected to be used in the fields of processing machines and medical laser devices, for example.

REFERENCE SIGNS LIST

1 . . . laser device
10 . . . light source
20 . . . optical combiner
30 . . . optical device
31 . . . preceding-stage optical fiber
32 . . . subsequent-stage optical fiber
35 . . . GRIN lens
40 . . . output unit
P1 . . . preparation process
P2 . . . measurement process
P3 . . . adjustment process

The invention claimed is:

1. A method for manufacturing an optical device having a GRIN lens, a preceding-stage optical fiber from which a light beam is entered to the GRIN lens, and a subsequent-stage optical fiber to which a light beam emitted from the GRIN lens is entered, the method comprising:
a measurement process in which a light beam is entered to the preceding-stage optical fiber and beam quality of a light beam to be emitted from the subsequent-stage optical fiber through the GRIN lens is measured; and
an adjustment process in which a length of the GRIN lens is adjusted on the basis of a result in the measurement process,
wherein the preceding-stage optical fiber is a multimode fiber.

2. The method for manufacturing an optical device according to claim 1, wherein
a diameter of a core of the subsequent-stage optical fiber is greater than a diameter of a light beam to be emitted from the GRIN lens.

3. The method for manufacturing an optical device according to claim 1, wherein
the adjustment process is performed by cutting the GRIN lens in a longitudinal direction.

4. The method for manufacturing an optical device according to claim 1, wherein
the adjustment process is performed by replacing the GRIN lens with another GRIN lens having a different length.

5. The method for manufacturing an optical device according to claim 1, wherein
a length of the GRIN lens is less than a half pitch.

6. The method for manufacturing an optical device according to claim 5, wherein
a length of the GRIN lens is a quarter pitch or more.

7. A method for manufacturing a laser device including
an optical device having a GRIN lens, a preceding-stage optical fiber from which a light beam is entered to the GRIN lens, and a subsequent-stage optical fiber to which a light beam emitted from the GRIN lens is entered, and
a light source configured to emit a light beam to be entered to the preceding-stage optical fiber, the method comprising:
a measurement process in which a light beam is entered from the light source to the preceding-stage optical fiber and beam quality of a light beam to be emitted from the subsequent-stage optical fiber through the GRIN lens is measured; and
an adjustment process in which a length of the GRIN lens is adjusted on the basis of a result in the measurement process,
wherein the preceding-stage optical fiber is a multimode fiber.

8. The method for manufacturing a laser device according to claim 7, wherein
a diameter of a core of the subsequent-stage optical fiber is greater than a diameter of a light beam to be emitted from the GRIN lens.

9. The method for manufacturing a laser device according to claim 7, wherein
the adjustment process is performed by cutting the GRIN lens in a longitudinal direction.

10. The method for manufacturing a laser device according to claim 7, wherein
the adjustment process is performed by replacing the GRIN lens with another GRIN lens having a different length.

11. The method for manufacturing a laser device according to claim 7, wherein
a length of the GRIN lens is less than a half pitch.

12. The method for manufacturing a laser device according to claim 11, wherein
a length of the GRIN lens is a quarter pitch or more.

13. A method for adjusting beam quality of a laser device including
an optical device having a GRIN lens, a preceding-stage optical fiber from which a light beam is entered to the GRIN lens, and a subsequent-stage optical fiber to which a light beam emitted from the GRIN lens is entered, and
a light source configured to emit a light beam to be entered to the preceding-stage optical fiber, the method comprising:

a measurement process in which a light beam is entered from the light source to the preceding-stage optical fiber and beam quality of a light beam to be emitted from the subsequent-stage optical fiber through the GRIN lens is measured; and an adjustment process in which a length of the GRIN lens is adjusted on the basis of a result in the measurement process, wherein the preceding-stage optical fiber is a multimode fiber.

* * * * *